United States Patent
Lemoine et al.

(10) Patent No.: US 7,059,766 B2
(45) Date of Patent: Jun. 13, 2006

(54) OPTICAL DEVICE AND METHOD FOR THE NON-INTRUSIVE MEASURING OF THE TEMPERATURE OF A FLOWING LIQUID

(75) Inventors: Fabrice Lemoine, Lamath (FR); Pascal La Vieille, Toulouse (FR)

(73) Assignee: Institut National Polytechnique de Lorraine (INPL), Vandoeuvre les Nancy (FR)

( * ) Notice: Subject to any disclaimer, the term of this patent is extended or adjusted under 35 U.S.C. 154(b) by 208 days.

(21) Appl. No.: 10/239,683

(22) PCT Filed: Mar. 12, 2001

(86) PCT No.: PCT/FR01/00723

§ 371 (c)(1),
(2), (4) Date: Sep. 5, 2002

(87) PCT Pub. No.: WO02/073145

PCT Pub. Date: Sep. 19, 2002

(65) Prior Publication Data

US 2003/0048831 A1     Mar. 13, 2003

(30) Foreign Application Priority Data

Mar. 9, 2000 (FR) ................................ 00 03005

(51) Int. Cl.
*G01K 13/00* (2006.01)
*G01N 21/64* (2006.01)

(52) U.S. Cl. .................. 374/161; 374/120; 374/142; 374/147; 374/148; 250/484.4; 356/318; 356/949; 356/951

(58) Field of Classification Search ............ 374/161, 374/120, 147, 159, 142, 148; 250/458.1, 250/459.1, 461.1, 484.4, 259; 356/318, 949, 356/951
See application file for complete search history.

(56) References Cited

U.S. PATENT DOCUMENTS

| 3,666,945 A | * | 5/1972 | Frungel et al. | 250/461.1 |
| 3,960,753 A | * | 6/1976 | Larrabee | 374/159 |
| 4,061,578 A | * | 12/1977 | Kleinerman | 374/121 |
| 4,409,476 A | * | 10/1983 | Lofgren et al. | 374/161 |
| 4,459,044 A | * | 7/1984 | Alves | 374/159 |
| 4,560,286 A | * | 12/1985 | Wickersheim | 374/159 |
| 4,613,237 A | * | 9/1986 | Melton | 250/459.1 |
| 4,708,494 A | * | 11/1987 | Kleinerman | 374/161 |
| 4,791,585 A | * | 12/1988 | Maki et al. | 374/159 |

(Continued)

FOREIGN PATENT DOCUMENTS

EP        0345188        12/1989

(Continued)

OTHER PUBLICATIONS

Derwent Accession No. 1997-323550, English Abstract of JP 09126837 A (published May 1997).*

(Continued)

*Primary Examiner*—Gail Verbitsky
*Assistant Examiner*—Stanley J. Pruchnic, Jr.
(74) *Attorney, Agent, or Firm*—Gary M. Cohen

(57) ABSTRACT

An optical method, and an optical device based on a laser source for implementing an optical method, for nonintrusively measuring the temperature of a flowing liquid by using the fluorescence induced by a laser beam in a measurement volume of the liquid, uses a single temperature-sensitive fluorescent tracer and at least two separate spectral detection windows on the tracer, after molecular dilution of the tracer in the liquid medium.

14 Claims, 1 Drawing Sheet

U.S. PATENT DOCUMENTS

| | | | |
|---|---|---|---|
| 4,885,633 A | | 12/1989 | Buck .................... 250/459.1 |
| 5,377,004 A | * | 12/1994 | Owen et al. ............ 250/458.1 |
| 5,755,512 A | * | 5/1998 | White ..................... 374/161 |
| 5,788,374 A | | 8/1998 | Bur et al. ................ 374/161 |
| 5,826,984 A | * | 10/1998 | Fima ....................... 374/161 |
| 2004/0032679 A1 | * | 2/2004 | Miteva et al. ............ 359/883 |

FOREIGN PATENT DOCUMENTS

| | | |
|---|---|---|
| FR | 2484639 | 12/1981 |
| FR | 2579320 | 9/1986 |
| JP | 09126837 | 5/1997 |

OTHER PUBLICATIONS

Patent Abstracts of Japan, vol. 1997, No. 09 (citing JP 09 126837) Published Sep. 30, 1997.

Lavieille, et al., "Evaporating and Combusting Droplet Temperature Measurements Using Two-Color Laser-Induced Fluorescence", Experiments in Fluids, vol. 31, pp. 45-55 (2001, no month).

Lavieille, et al., "Investigation on Temperature of Evaporating Droplets in Linear Stream Using Two-Color Laser-Induced Fluorescence", Combustion Science and Technology, vol. 174, pp. 117-142 (2002, no month).

Castanet, et al., "Energetic Budget on an Evaporating Monodisperse Droplet Stream Using Combined Optical Methods—Evaluation of the Convective Heat Transfer", Int. J. of Heat and Mass Transfer, vol. 45, pp. 5053-5067 (2002)(no month).

Castanet, et al., "Measurement of the Temperature Distribution Within Mono-disperse Combusting Droplets in Linear Streams Using Two-Color Laser-Induced Fluorescence", Experiments in Fluids, vol. 35, pp. 563-571 (2003) (no month).

Lavieille, et al., "Non-Intrusive Temperature Measurements Using Three-Color Laser-Induced Fluorescence", Experiments in Fluids, vol. 36, pp. 706-716 (2004). (no month).

* cited by examiner

OPTICAL DEVICE AND METHOD FOR THE NON-INTRUSIVE MEASURING OF THE TEMPERATURE OF A FLOWING LIQUID

BACKGROUND OF THE INVENTION

The present invention relates to an optical method and to an optical device which uses a laser source for nonintrusively measuring the temperature in a flowing liquid.

Temperature measurement devices based on a laser source are known. For example, European Patent Application No. 345188 discloses a device which operates based on the observation of interference fringes created within a flowing fluid in a pipe. These observations are made at the output of two optical fibers which transport light from an external laser source. The disclosed apparatus is satisfactory for such situations, but does require intrusion in the fluid being studied, something that is not always possible.

Various nonintrusive techniques for measuring the parameters of a fluid (for example, temperature or pressure) are already known. For example, French Patent Application 2,579,320 discloses an ultrasonic wave measurement method which is intended for the thermal monitoring of nuclear reactors. The disclosed technique allows only a single parameter of the fluid to be measured, namely, its temperature.

The main drawback of presently known nonintrusive temperature measurement devices is their excessively long response time. In difficult situations, such as measurement of the temperature of droplets, in a spray for example, where the measured volume changes due to evaporation over time during measurement, in liquid-gas two-phase flow, in the measurement of the temperature field in a plane, and in the measurement of temperature in a turbulent flow, such measurement remains difficult, if not impossible to carry out. Also, there are difficulties in obtaining an apparatus that has a short response time and which disturbs the flow as little as possible.

SUMMARY OF THE INVENTION

To solve these problems, it has been found that optical methods can be used. In particular, it has been found that laser-induced fluorescence methods useful for determining the concentration of a fluid can be used. Such methods operate according to the principle which follows.

Fluorescence, a physical phenomenon which has long been known, is the consequence of an excited state of a fluorescent species being deactivated toward a ground state by spontaneous emission. The excited state may be induced by laser radiation having a wavelength which coincides with the absorption spectrum of the fluorescent species. The time between the absorption and emission of a photon is of the order of a few nanoseconds, which makes the technique applicable to the study of rapidly varying phenomena. The time resolution may reach a few tens of kHz.

When laser radiation passes through a medium seeded with a low concentration (or a higher, but constant or slightly varying concentration) of a fluorescent tracer, the fluorescence intensity may be expressed by the equation:

$$I_{fluo} = K_{opt} K_{spec} C V_c I_o e^{\beta 1/T}$$

where $K_{opt}$, $V_c$, $I_o$ and C are the coefficients characterizing the optical system, the volume in which the fluorescent photons are collected, the incident laser intensity, and the molecular concentration of the fluorescent tracer, respectively, and I is the temperature. $K_{spec}$ and $\beta$ are constants, depending only on the characteristics of the molecule used as the fluorescent tracer.

Applying this principle allows the temperature to be obtained in simple situations in which the volume, the concentration and the local laser intensity are well controlled or remain constant.

A first technique for applying this physical principle to the measurement of temperatures partly eliminates the drawbacks previously mentioned by using two fluorescent tracers to solve the problems of laser intensity and volume. However, many difficulties nevertheless remain. The concentration of each of the two tracers must be controlled, and the emission spectra of the two tracers must be sufficiently separate so as to be able to separate the fluorescent emissions of each of the tracers by means of a set of interference filters. However, this is difficult to achieve in practice.

To resolve all of the above-listed problems, it has been found that a single tracer, with molecular dilution in the liquid medium whose temperature is to be measured, can be used.

Moreover, U.S. Pat. No. 5,788,374 A refers to chemiluminescence induced by white light (lamp or xenon). The photophysics used is completely different from that of the present invention, and in actuality relies on the detection of fluorescence in two spectral bands, but from two different products created by a chemical reaction, the kinetics of which depend on temperature.

The reaction disclosed in U.S. Pat. No. 5,788,374 A is of the type, M+hυM*. In the presence of a partner N (which in the cited U.S. patent appears to be the matrix of the molten polymer in which the fluorescent product is in solution), the monomer in the excited state M* can either emit fluorescence in a wavelength range 1M*→M+hυ$_1$ or be converted into an exciplex E* after reacting with the partner N, which itself will give off fluorescence in a wavelength range according to the reaction:

The ratio of the fluorescence of the monomer, in a first wavelength range, to that of the exciplex, in a second wavelength range which depends on temperature, is therefore detected.

In the foregoing technique there are, therefore, two fluorescent products. In the two-color fluorescence technique of the present invention, there is only a single fluorescent product. In addition, the two-color fluorescence method of the present invention uses ultrarapid photophysics principles relating to electronic transition and collisional deactivation phenomena, and not the kinetics of a chemical reaction induced by irradiation. The response time of the technique is in this way considerably improved.

Also known is French Patent Application No. 2,484,639, which discloses a method which is an intrusive method because it requires the presence of sensors at various measurement locations, whereas the method of the present invention is a nonintrusive method. Furthermore, the fluorescent material used is a solid-state material (see, page 8, lines 2–3), whereas the tracer of the present invention is a tracer in molecular solution in the liquid whose temperature is being measured.

Also known, from a Japanese Patent Abstract, is a method which seeds with fluorescent particles, and not with a tracer in molecular solution, and which uses irradiation with UV light, and not a laser radiation.

The present invention employs an optical method for nonintrusively measuring the temperature of a flowing liquid which uses fluorescence induced by laser radiation in a measurement volume of the liquid, and which uses a single temperature-sensitive fluorescent tracer and at least two separate spectral detection windows on this same tracer, after molecular dilution of the tracer in the liquid medium.

The method preferably comprises the steps of receiving an optical signal and completely eliminating scattering or reflection of the exciting laser component, splitting the optical signal into several light signals, creating a detection window for each light signal obtained after the splitting step, amplifying the light signals received in the detection windows and converting the light signals into a corresponding number of electrical signals, and acquiring, processing and displaying the electrical signals.

A device for nonintrusively measuring the temperature of a flowing liquid, in accordance with the present invention, by using the fluorescence induced by laser radiation in a measurement volume of the liquid, is adapted to implement the method of the present invention and comprises a single reception channel having a holographic band-rejection filter and a unit for splitting the optical signal into two light signals, at least one optical measurement channel having a filter for creating a measurement window and an amplifier for amplifying and converting the light signals into electrical signals, and a computing system.

Preferably, the laser radiation is produced by a single laser beam, a double laser beam, or a laser sheet, and the filter creating the measurement window is a band-pass interference filter, a high-pass filter, or a low-pass filter. Preferably, a band-pass interference filter having a bandwidth $\Delta\lambda_1$, through which a first signal passes, centered on a wavelength $\lambda_1$, is chosen for one measurement channel and a high-pass filter, through which a second signal passes, letting through an optical intensity above a threshold wavelength $\lambda_2$, is chosen for the other measurement channel.

A further understanding of the present invention will be gained from the description of a nonlimiting embodiment which is provided below, with reference to the following illustrations.

DETAILED DESCRIPTION OF THE INVENTION

The method of the present invention uses a single fluorescent tracer. The tracer is in molecular dilution in the liquid medium whose temperature is to be measured, there is no transformation of the chemical type, and the fluorescent properties of the tracer arise from one and the same molecule.

In a nonlimiting example, which is described below, the tracer used is Rhodamine B ($C_{28}H_{31}ClN_2O_3$), which is known to be particularly sensitive to temperature. In addition, the temperature sensitivity of this tracer differs depending on the spectral band of the fluorescent spectrum in question. In a first example, the present invention uses a single tracer and two separate spectral detection windows on this same tracer. The resulting sensitivity of the method of the present invention is around 2% of the variation in the fluorescence signal per ° C., which, taking into account the observed signal-to-noise ratio, leads to an accuracy to within 1° C. in the temperature. Detection therefore takes place on two predefined spectral windows, and not by studying complete spectra. As a result, the use of a spectrometer is not required. Instead, simple photodetectors can be used, for example, photodiodes, photomultipliers, CCD cameras, etc.

Figure 1:
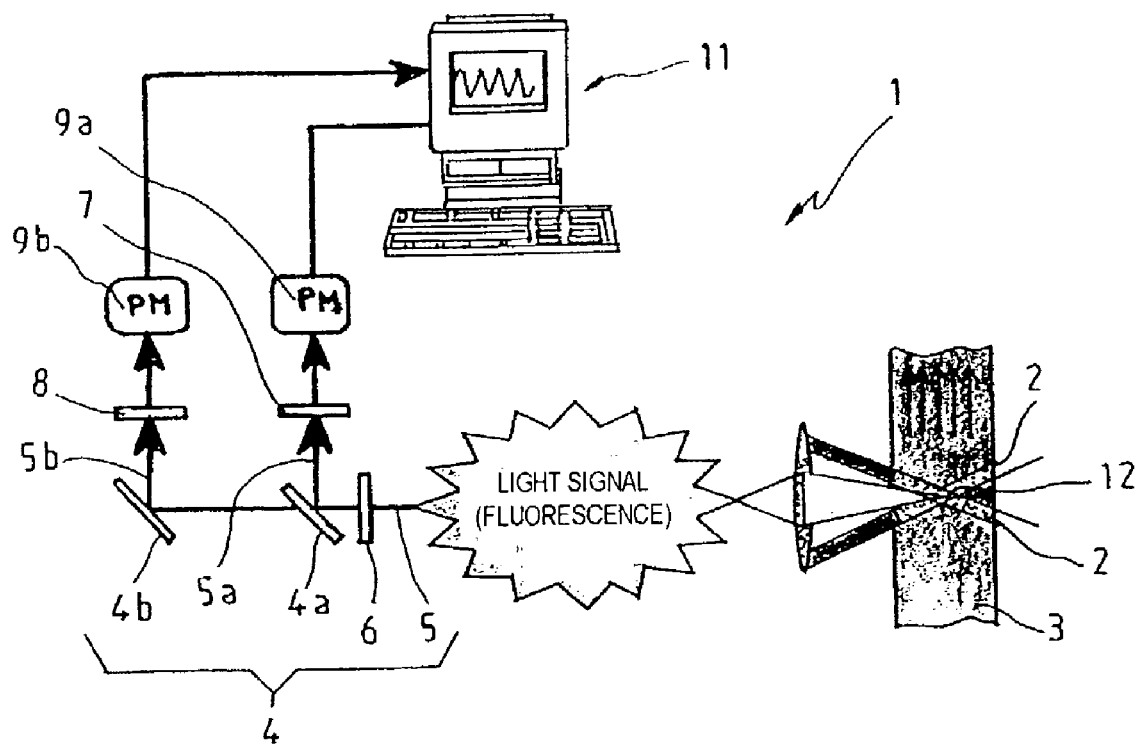
FIG. 1 is a diagram showing the operating principle of the device of the present invention.

To implement this method, and referring to FIG. 1, a device (1) is provided which is based on the fluorescence induced by laser radiation (2) in a measurement volume (3) of a flowing liquid, allowing splitting of the signals and the detection thereof. The laser radiation can be in the form of one or two laser beams, or a laser sheet. In particular, the use of two laser beams intersecting at a point defining the measurement volume makes it possible to simultaneously measure the velocity using a commercially available velocity meter system.

As an example, the device comprises a single reception channel with a holographic band-rejection filter (6) for removing all scattering or reflection of the exciting laser component, and a unit (4) for splitting the optical signal (5) into at least two equal or non-equal light signals (5a, 5b). For example, two light signals can be defined, using two neutral splitters (4a, 4b), according to the desired power in each channel.

Figure 2:
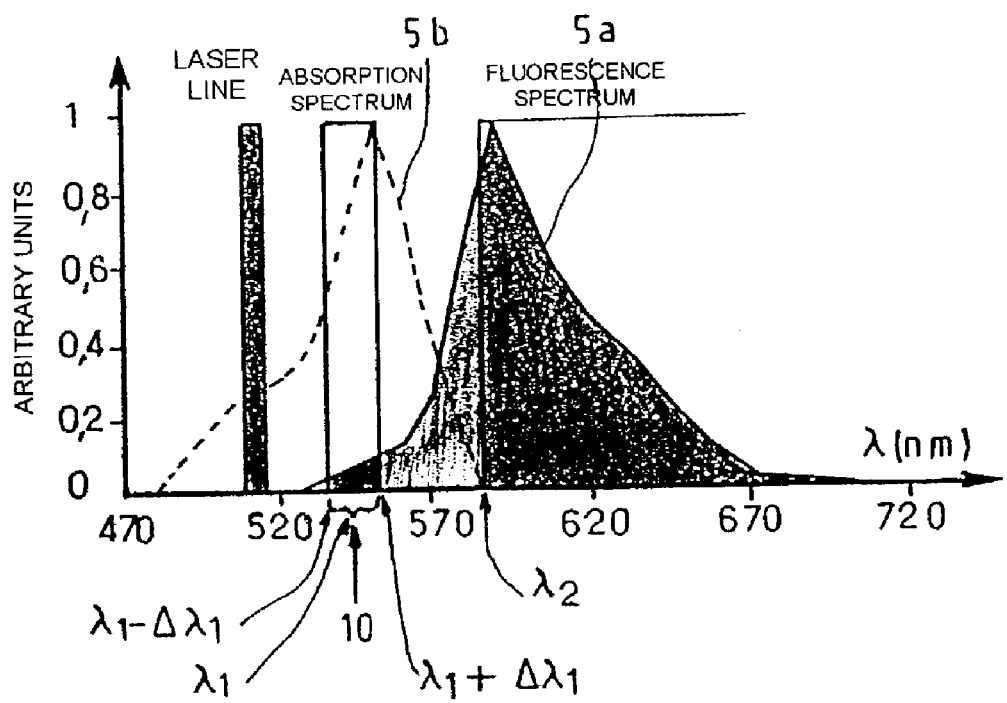
FIG. 2 is a graph showing the positions of the detection windows on the emission spectrum of Rhodamine B.

In each optical measurement channel, a filter, possibly a band-pass interference filter, a high-pass filter or a low-pass filter, is used to create a measurement window appropriate to the tracer used. For the example described herein (Rhodamine B dissolved in ethanol), the following was preferably selected for use. The signal (5a) passes through a band-pass interference filter (7), making it possible to obtain the first measurement window (10) shown in the graph of FIG. 2. For the tracer used, the filter (7) is centered on a wavelength $\lambda_1 \pm \Delta\lambda_1$, preferably 530 nm±5 nm. The signal (5b) passes through a high-pass filter (8), letting through the optical intensity above a threshold wavelength $\lambda_2$; preferably $\lambda_2$=approximately 590 nm. The essential criterion in the choice of wavelengths is that of having different temperature sensitivities.

The windows and the wavelengths are chosen according to the temperature response curve of the tracer or of the tracer-solvent mixture. Cost criteria may also be involved in the choice of filters. In the present description, and in the claims which follow, the term "window" is understood to have its general meaning, i.e., a window possibly being composed of one or more wavelength ranges, which may or may not be limited. Likewise, the term "separate" does not exclude any partial overlap or the inclusion of the windows, and the expressions "measurement window" and "detection window" have the same meaning.

An amplifier (9a, 9b) is provided for amplifying and converting the light signals (5a, 5b) into electrical signals, for example, a photomultiplier, a photodiode or a CCD sensor. Such amplifiers provide for the precise measurement, with a short response time, of the fluorescence intensities. A computing system (11), with corresponding software, receives the electrical signals via an acquisition system (not shown), processes the received electrical signals, and displays the results on a screen.

The collected fluorescence intensity of the first signal (5a) can be written according to the simplified equation:

$$I_{f1} = K_{opt1} K_{spect1} C I_o V_c e^{\beta_1/T}.$$

Likewise, the fluorescence intensity of the second signal (5b) satisfies the equation:

$$I_{f2} = K_{opt2} K_{spect2} C I_o V_c e^{\beta_2/T}.$$

Both of the above equations are expressed with the proviso that the relevant absorption coefficients with respect to the fluorescence intensity are similar in the relevant spectral windows, or that the product C·x can vary slightly in relation to the control, thereby allowing simplification, where x denotes the optical path traveled by the fluorescence signal in the absorbent medium.

Thus, the ratio of the measurement of the fluorescence intensity of the signals received in the detection windows is given by the equation:

$$R_f = \frac{I_{f1}}{I_{f2}} = Ke^{(\beta_1-\beta_2)/T} \quad (E_1)$$

where K is a constant that only depends on the optical system used, and on the spectroscopic properties of the molecule used as the fluorescent tracer. This ratio has the advantage of being independent of the concentration of the fluorescent tracer, of the exciting laser intensity, and of the excited fluorescent volume. The apparatus constant (K) is determined by a single initial calibration point at a known temperature $T_o$. Equation ($E_1$) is thus transformed to:

$$\ln\left(\frac{R_f}{R_{fo}}\right) = (\beta_1-\beta_2)\left(\frac{1}{T}-\frac{1}{T_o}\right) \quad (E_2)$$

where $R_{fo}$ is the ratio at the temperature $T_o$. This law was confirmed experimentally.

In addition to the temperature, it is possible to simultaneously obtain the concentration of the liquid, or the measurement volume (3).

When the relevant absorption coefficients with respect to the fluorescence intensity are not similar in the relevant spectral windows, or when the product C·x varies significantly with respect to the control, the absorption phenomena of the fluorescence must be taken into account. In this case, a third channel and a third measurement window can be added so as to quantify this absorption.

The tracer chosen was Rhodamine B, diluted in alcohol to 2 mg/l, which has been found to be satisfactory and to allow two spectral bands to be isolated. However, other tracers, such as, for example, Oregon 488, Rhodamine 6 G, and other dilution liquids such as water, could be used.

The present invention can advantageously be used to measure the temperature of spray droplets. The difficulty in using prior techniques resides in the variation in the measurement volume because of the temperature. Since this parameter is absent from equation $E_2$, it has no influence on the measurements obtained in accordance with the present invention. The present invention can also be used to measure the temperature in a turbulent flow, for which devices with a suitable response time are unknown. The present invention can also be used to measure the temperature distribution in a measurement plane through which a flowing fluid passes, independently of the variations in the local laser intensity.

The invention claimed is:

1. An optical method for nonintrusively measuring temperature of a flowing liquid, comprising the steps of:
   placing a single temperature-sensitive fluorescent tracer in molecular dilution in the liquid in a defined measurement volume;
   defining at least two separate spectral detection windows on the single temperature-sensitive fluorescent tracer;
   inducing fluorescence in the measurement volume using laser radiation;
   detecting the fluorescence induced in the measurement volume in the separate spectral detection windows and processing the detected fluorescence induced in the measurement volume in the separate spectral detection windows to measure the temperature of the flowing liquid.

2. The method of claim 1 wherein the tracer is Rhodamine B ($C_{28}H_{31}ClN_2O_3$).

3. The method of claim 1 wherein the detecting and processing step further includes the steps of:
   receiving an optical signal corresponding to the fluorescence induced in the measurement volume, and completely eliminating scattering and reflection of excited laser components;
   splitting the optical signal into a plurality of light signals;
   defining separate measurement windows for each of the light signals obtained after the splitting;
   amplifying each of the light signals received in the separate measurement windows, and converting the light signals into a corresponding number of electrical signals; and
   acquiring, processing and displaying the electrical signals.

4. The method of claim 3 which uses two measurement windows, and which further includes the steps of measuring fluorescence intensity for the light signals received in the two measurement windows, and calculating a ratio Rf of a first measured fluorescence intensity $I_{f1}$ for the light signals received in a first of the two measurement windows and a second measured fluorescence intensity $I_{f2}$ for the light signals received in a second of the two measurement windows, wherein:

$$R_f = \frac{I_{f1}}{I_{f2}} = Ke^{(\beta_1-\beta_2)/T}.$$

where K is a constant which depends on the fluorescence intensity measurement and on spectroscopic properties of the tracer, β is a constant which depends on characteristics of the tracer, and T is the temperature.

5. The method of claim 4 which further includes the step of determining the constant K at a single initial calibration point at a known temperature To, and transforming the ratio to an equation:

$$\ln\left(\frac{R_f}{R_{fo}}\right) = (\beta_1-\beta_2)\left(\frac{1}{T}-\frac{1}{T_o}\right),$$

where $R_{fo}$ is the ratio at the temperature $T_o$.

6. The method of claim 1 which further includes the step of simultaneously measuring an additional characteristic selected from the group of characteristics consisting essentially of a velocity of the liquid, a concentration of the liquid, and the measurement volume.

7. A device for nonintrusively measuring temperature of a flowing liquid using the optical method of claim 5, the device comprising:
   a single reception channel including a holographic band-rejection filter and a splitter for splitting an optical signal corresponding to the fluorescence induced in the measurement volume into two light signals;
   an optical measurement channel for receiving each of the two light signals, wherein each optical measurement channel includes a filter for defining a measurement window, and an amplifier for amplifying and converting the light signals into electrical signals; and a computing system for processing the electrical signals.

8. The device of claim 7 wherein the filter for defining the measurement window is selected from the group of filters consisting essentially of a band-pass interference filter, a high-pass filter, and a low-pass filter.

9. The device of claim 8 wherein a first optical measurement channel includes a band-pass interference filter having a bandwidth $\Delta\lambda_1$ centered on a wavelength $\lambda_1$, for receiving a first of the light signals, and a second optical measurement channel includes a high-pass filter passing optical intensities above a threshold wavelength $\lambda_2$, for receiving a second of the light signals.

10. The device of claim 9 wherein $\lambda_1$ is equal to approximately 530 nm.

11. The device of claim 9 wherein $\lambda_2$ is equal to approximately 590 nm.

12. The device of claim 9 which further includes an additional measurement window and an additional measurement channel for quantifying absorption phenomena of the fluorescence induced in the measurement volume.

13. The device of claim 7 wherein the laser radiation is produced by a laser source selected from the group of sources consisting essentially of a single laser beam, a double laser beam, and a laser sheet.

14. The device of claim 7 which further includes photodetectors for detecting the light signals.

* * * * *